Figure 9:
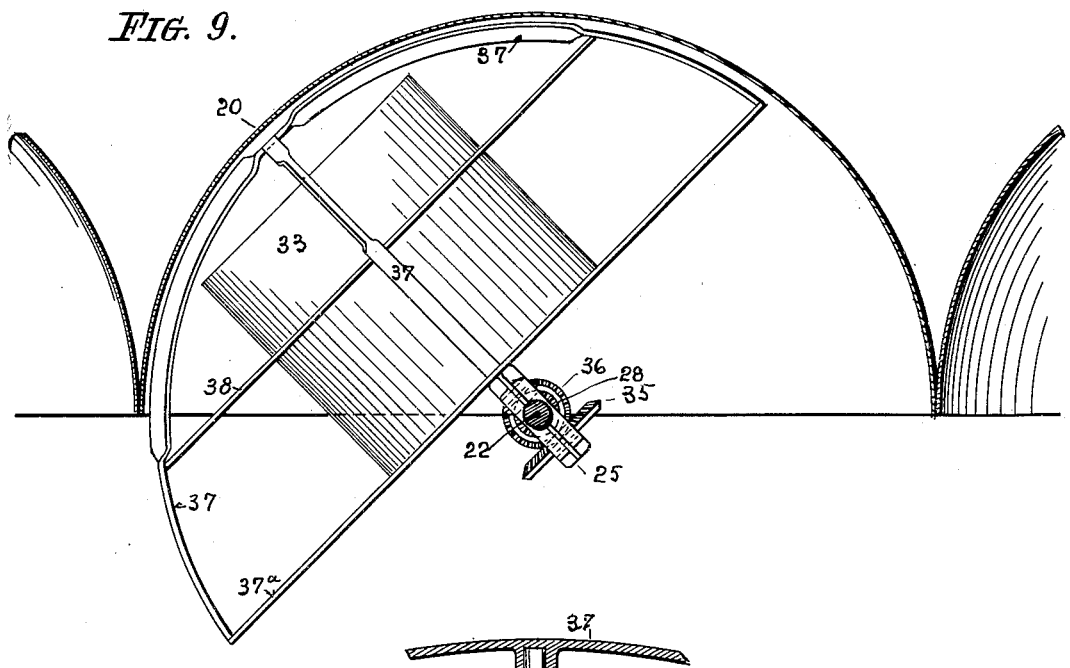

R. SCHMIECHEN.
AIR SHIP.
APPLICATION FILED SEPT. 16, 1908.
931,225.
Patented Aug. 17, 1909.
5 SHEETS—SHEET 1.
FIG. 1.
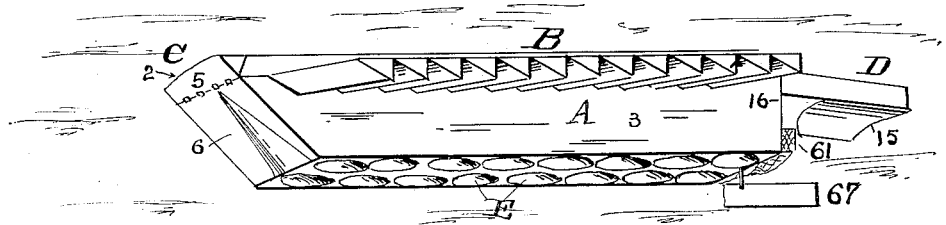
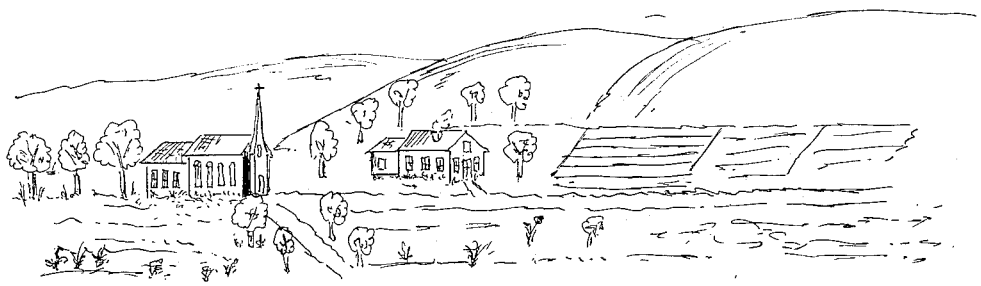
FIG. 2.
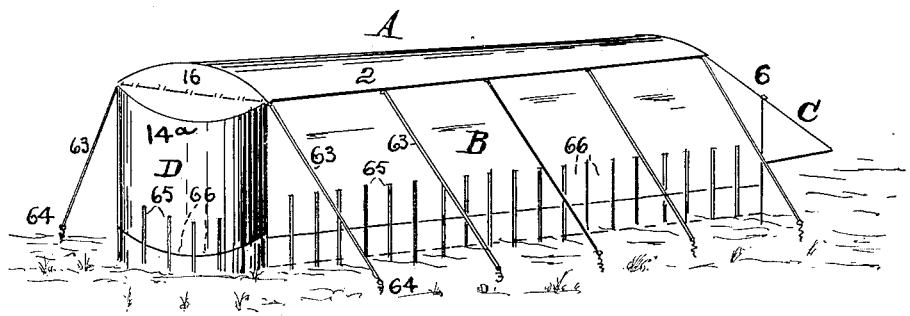
Witnesses:
E. Knudsen.
A. G. Peterson.
Inventor:
Reinhold Schmiechen,
By Michael J. Stark & Sons,
Attorneys.

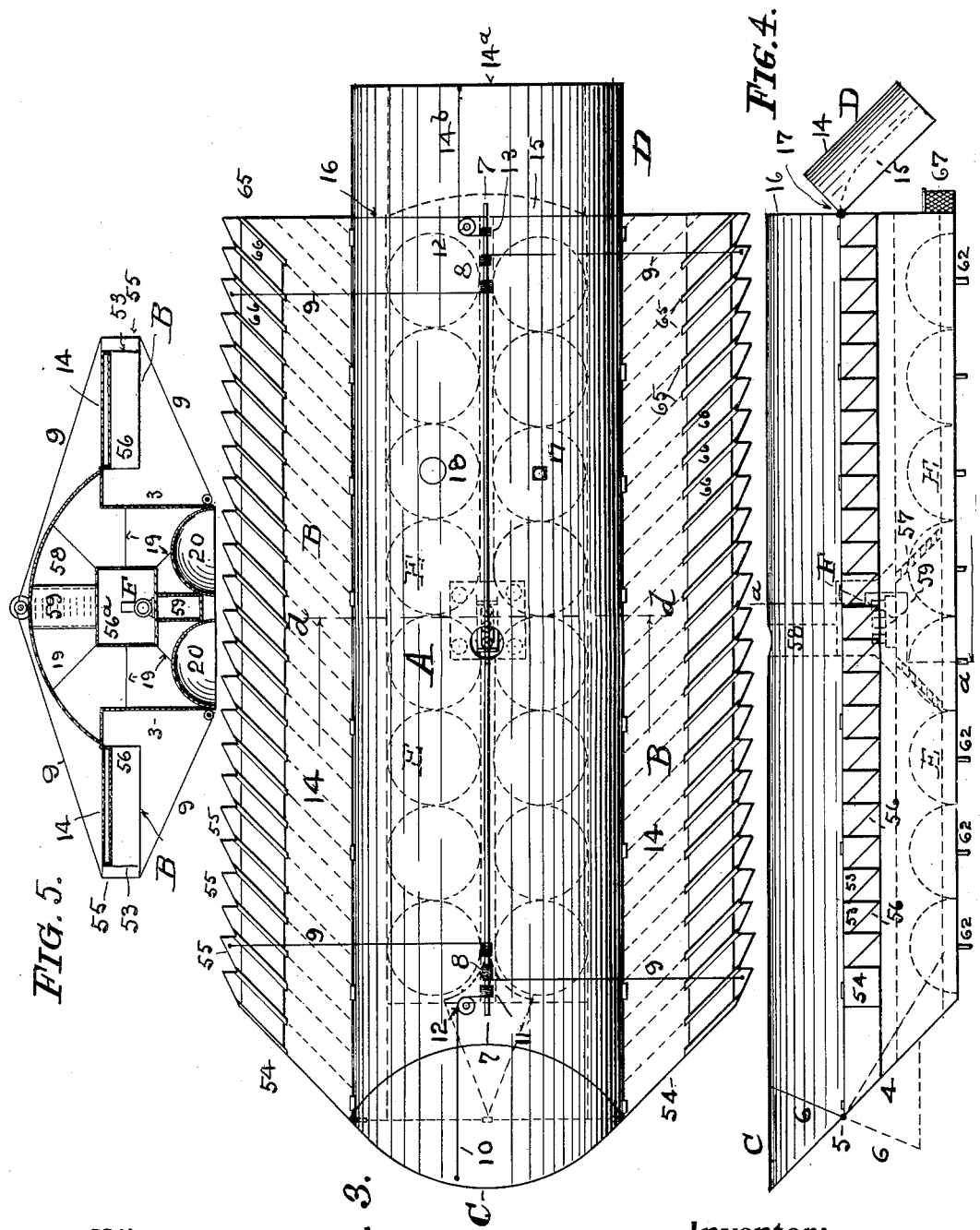

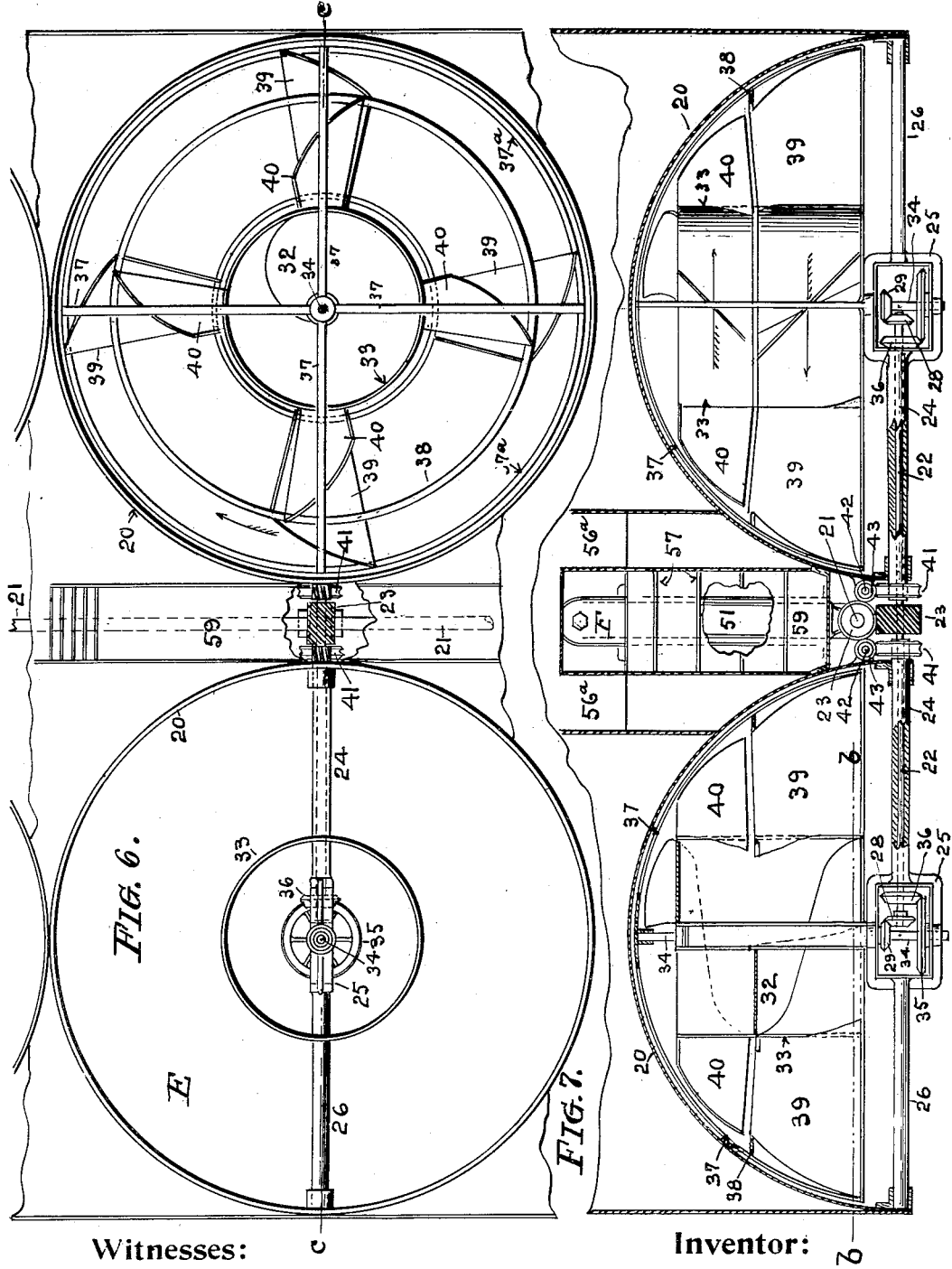

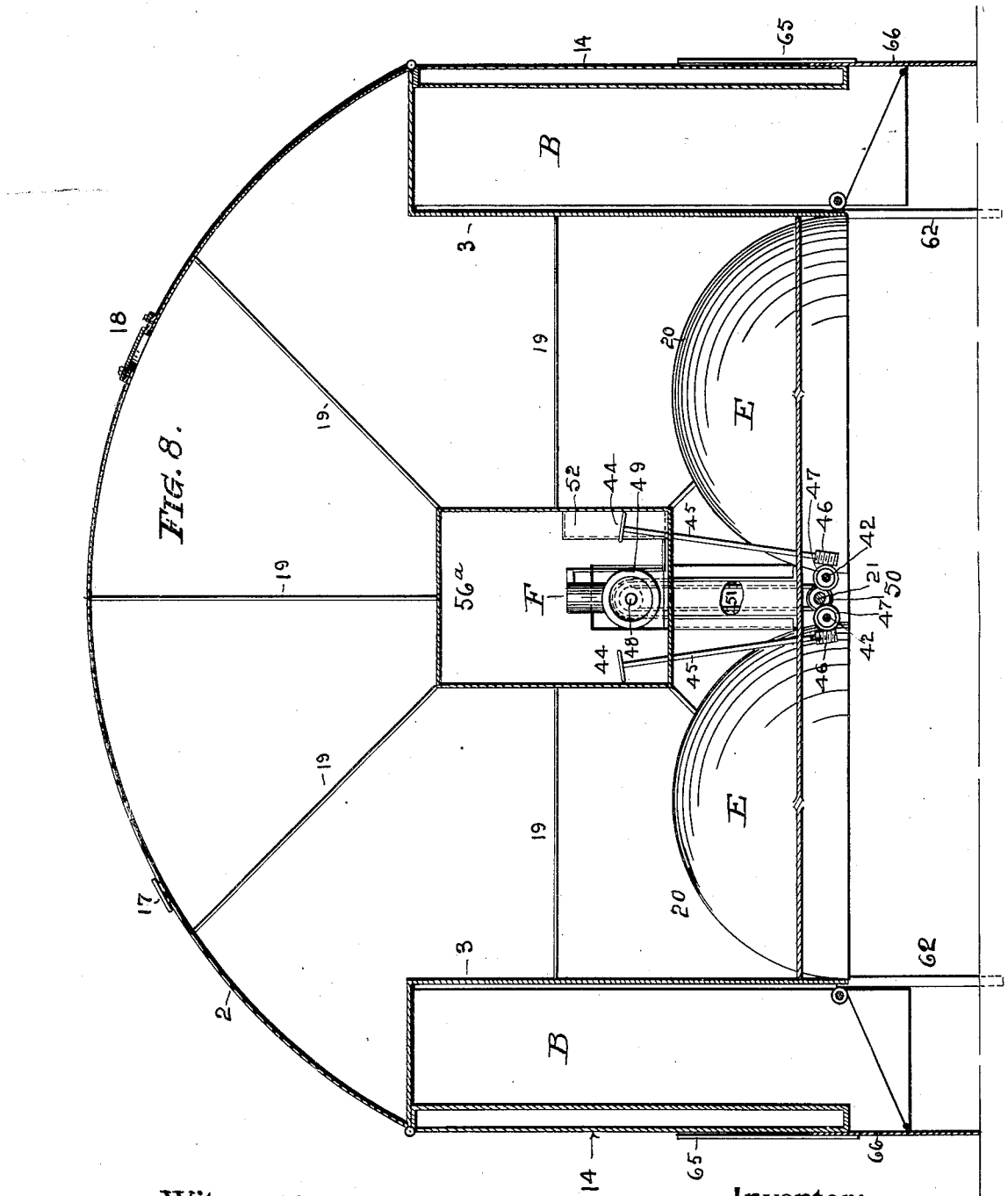

R. SCHMIECHEN.
AIR SHIP.
APPLICATION FILED SEPT. 16, 1908.

931,225.

Patented Aug. 17, 1909.
5 SHEETS—SHEET 5.

Witnesses:
E. Knudsen
A. G. Peterson

Inventor:
Reinhold Schmiechen,
By Michael J. Stark & Sons,
Attorneys.

UNITED STATES PATENT OFFICE.

REINHOLD SCHMIECHEN, OF NEWELL, IOWA.

AIR-SHIP.

No. 931,225.　　　Specification of Letters Patent.　　　Patented Aug. 17, 1909.

Application filed September 16, 1908. Serial No. 453,305.

*To all whom it may concern:*

Be it known that I, REINHOLD SCHMIE-CHEN, an alien, a former subject of the Emperor of Germany, but who have declared my intention to become a citizen of the United States, and a resident of Newell, in the county of Buena Vista, in the State of Iowa, have invented an Air-Ship; and I do hereby declare that the following description of my said invention, taken in connection with the accompanying sheets of drawings, forms a full, clear, and exact specification, which will enable others skilled in the art to which it appertains, to make and use the same.

This invention has general reference to air-ships; and it consists, essentially, in the novel and peculiar combination of elements and parts and details of construction, as hereinafter first fully set forth and described, and then pointed out in the claims.

The object of this invention is the production of an air-ship, heavier than air, which shall be capable of rising directly from the ground, be dirigible so as to travel in any direction, be capable of floating upon and traveling in water, and to rise from water into the air. It shall also be so constructed that when upon the ground it shall be fully protected from the effects of storm and high winds.

Heretofore an air-ship has not yet been developed that is capable of floating and moving in both, air and water. These results I propose to accomplish by the construction hereinafter to be fully disclosed, and which is shown and illustrated in the drawings already referred to and in which—

Figure 10:
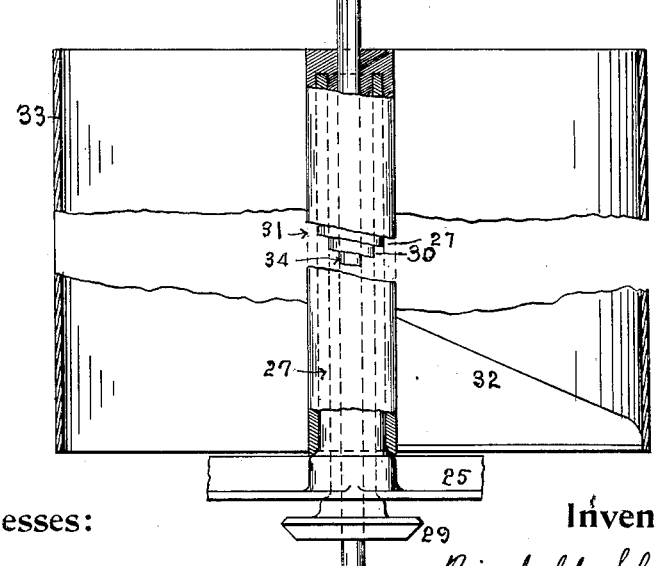

Figure 1 is a perspective view of the air-ship afloat in the air. Fig. 2 is a perspective view of the air-ship anchored on the ground. Fig. 3 is a plan of the air-ship, and Fig. 4 a side elevation of the same. Fig. 5 is a transverse sectional elevation in line *a a* of Fig. 4, looking toward the forward end of the airship. Fig. 6 is a plan of a portion of the air-ship illustrating the construction of the cyclone-producers, taken in line *b b* of Fig. 7, the cyclone-producer shown to the left of said figure having its interior mechanism partly removed to illustrate underlying parts. Fig. 7 is a transverse sectional elevation in line *c c* of Fig. 6. Fig. 8 is a transverse-sectional elevation of the air-ship in line *d d* of Fig. 3. Fig. 9 is a longitudinal sectional elevation of the cyclone-producer showing the fan mechanism when placed in an inclined position. Fig. 10 is a transverse-sectional elevation of the inner cylinder of the cyclone-producer illustrating details of construction.

Like parts are designated by corresponding symbols of reference in all the figures.

First briefly describing this air-ship, it consists, of a metallic, gas-tight, body of rectangular contour having a curved roof projecting beyond the sides of the ship. This body is, at its forward end, downwardly and rearwardly inclined, a portion of this forward end being a separate part hinged to the main portion of the body and forming what I term the head. On both sides, and even with the projecting portion of, and attached to the longitudinal edges of the roof are hinged hollow, gas-tight, metallic bodies of zig-zag contour forming, as it were, wings, while to the rear end of the main body there is hinged, even with the projecting portion of the roof a hollow, metallic, gas-tight body which I designate the tail of the air-ship.

In the interior of the main body there are a series of fans which I shall hereafter name cyclone-producers, which fans are operated by a suitable motor also located in said main body. These fans or cyclone-producers are pivoted so as to be capable of changing from a vertical, to a horizontal position, whereby the air-ship may be caused to rise vertically when the cyclone-producers stand and operate in a vertical position, or to travel at any desired inclination, or horizontally, according as the cyclone-producers are inclined more or less toward, or into a horizontal position.

The lower surfaces of the wings, as well as their outer sides are formed into a series of inclined planes which assist in sustaining the air-ship in the air, hydrogen gas being used in the hollow bodies to make the air-ship nearly self-sustaining or floating in the air, the ship being designed so that its weight, when filled with gas, shall be but slightly heavier than air, so that, should for any reason, the propelling apparatus become inoperative, the air-ship will slowly descend, the main body with its extended wings and tail forming, as it were, an air-resisting body which would prevent a rapid descent of the air-ship when disabled.

A in the drawings represents and designates the main body of this air-ship. It is of rectangular contour having a roof 2, which is curved as shown, and which projects beyond the sides 3, a distance equal to the thickness of the wings D, so that when the latter are folded down upon the sides of the air-ship they are even with the outer edges of the roof. The forward end of this body A is downwardly and rearwardly inclined at 4, whereby an inclined plane is produced which assists in the floating of the airship. A portion, C, of this forward end of the air-ship is separately hinged to the body at 5, and forms the head of the air-ship. When anchored to the ground, this head C is turned downwardly, as shown in dotted lines in Fig. 4 and also in perspective, in Fig. 2, whereby a reverse inclined plane 6 is produced which, in case of a storm, tends to push and hold the air-ship to the ground to prevent damages to the structure. Means for raising and lowering the head C, as well as the wings B and the tail D are provided, and shown in Fig. 3, and consist of a longitudinal shaft, 7, which carries a series of winding drums 8, over which ropes 9 are wound that reach, and are attached to, the wings B at a number of different places, while further rope-sheaves 11 and 13, and pulleys 12, guide a rope 10, to the head C, and a rope 14$^b$, to the tail D, whereby these members B, C and D may be raised and lowered and held in position by these ropes.

D is the tail. It is a metallic, hollow body of substantially rectangular contour, the upper surface 14$^a$, or roof, as it were, being curved substantially the same as the roof 2 of the main body. The under side of this tail is concave, as shown at 15, the object of which will hereinafter appear. This tail D is hinged to the rear-wall 16, of the main body A, in a line level with the projecting portion of the roof, and when the air-ship is floating or moving in the air, this tail is slightly inclined downwardly, as illustrated in Fig. 4, while at times it may be desired to retain it in a horizontal position. The main body, as well as the head, wings, and the tail are preferably made from aluminum so that the air-ship is as light as possible, and suitable filler-plugs, 17, are provided, as shown in Fig. 8, through which hydrogen-gas is introduced to inflate, as it were, these bodies. A man-hole 18, Fig. 8, having a suitable closure, being also provided, through which access to the interior of the main body A may be had should this become necessary. It is evident that the walls of the metallic bodies require bracing to prevent them from distortion, and while at this time, I do not show the specific details of such bracing, I have illustrated in Figs. 5 and 8 a construction consisting of fine, but extremely strong wires, 19, attached to the various parts. This system of bracing does not at present form a part of this application, and I do not, therefore, refer to the same more specifically.

The bottom of the main body A, consists of a series of hemispherical shells 20, which with their interior mechanism forms the cyclone-producers E, and this interior mechanism being alike in all the cyclone-producers, I shall hereinafter describe them in the singular, and refer particularly to Figs. 6 to 10. Longitudinally, and in the center line of the body A there is located a main driving shaft 21, which is suitably supported in bearings, not shown, while transversely and centrally underneath each of the cyclone-producers is a transverse shaft 22, which main shaft and transverse shafts are connected together by means of spiral gears 23. Each of these transverse shafts 22 revolves in a tube 24, formed integral with a yoke 25, and a shaft 26, and also a vertical tubular sleeve 27. On the outer ends these shafts 22 carry miter gear wheels 28, engaging similar gear wheels 29, which latter gear wheels are fastened to a tubular sleeve 30, which, at its upper end, is connected with a tubular sleeve 31, placed upon the sleeve 27 and revolving thereupon. To the outer periphery of this tubular sleeve 30 are secured spirally formed vanes 32, the outer edges of which are secured to a cylindrical shell 33, so that when the miter gear wheel 29 is revolved, the vanes 32 and the cylindrical shell 33, will revolve together.

Centrally through the sleeve 30 passes a shaft 34 which has at its lower end a bevel gear wheel 35 which engages a bevel-pinion 36, which is secured to the shaft 22 and thereby revolves the shaft 34, but in a direction opposite to that in which the cylinder 33 rotates. To the upper end of this central shaft 34 is secured a spider, composed of four (more or less) curved spokes 37 which are bent to a semi-circle and are in close proximity to the inner surface of the hemispherical shell 20. Their lower ends are fastened to a ring 37$^a$, and a further ring 38, is secured to these spokes 37 about midway between the lower ring 37 and the apex of the semi-circular spokes. To these two rings are secured vanes, 39, which are inclined in the opposite direction of the vanes 32, and revolving in the opposite direction will force air downwardly. To the outer periphery of the cylinder 33, there are fastened, near its upper end, further vanes, 40, which, however, incline in the direction opposite that of the vanes 39 and 32.

Upon the inner end of the tubular sleeve 24, there is secured a worm-wheel 41 which is engaged by a worm 43, located upon a horizontally disposed shaft 42, which shaft, when revolved by means of a hand-wheel 44, placed upon the shaft 45, carrying at its lower end a worm 46, engaging a worm wheel 47, rotates the shaft 42 and with it the entire mechanism in the interior of the hemispheres 20 to move the same from the vertical position shown in Figs. 6 and 7, to an inclined or horizontal position, as the case may be, an inclined position being shown in Fig. 9.

I will here state that there are four sections of horizontal shafts 43, viz., two connect with the forward one-half of all the cyclone-producers and two sections connect with the rearwardly located series of cyclone-producers so that either the forwardly, or rearwardly located cyclone-producers may be inclined independently or the other sets. The object of thus arranging the cyclone-producers is to assist in the flight of the machine and to direct its course, as will be further explained. It will also be observed that either of the four sections or series of cyclone-producers may be independently inclined.

F, Figs. 5, 7 and 8, is the motor. It is of any approved design and preferably (though not necessarily) of the internal-combustion type. Upon its crank shaft 48, there is located a sprocket-wheel 49, and upon the main driving shaft 21, there is placed a similar sprocket-wheel 50, a chain belt 51 connecting the two sprocket-wheels 49 and 50 and communicating rotary motion to the main shaft; a tank 52, Fig. 8, being located conveniently in the air-ship to contain, and supply, the motor F with the required liquid or gaseous fuel.

B are the wings. These wings are metallic, gas-tight bodies, each of which is composed of a series of shells triangular in transverse section, and running obliquely from the front to the rear of the air-ship, thus forming a series of separate compartments 53, all connected to a common roof 14 which forms, as already stated, the upper face of the wings when extended, and cover the vertical sides of the air-ship when lowered. The forward ends 54, of these wings, owing to the oblique position of the compartments 53, forms an inclined plane in the direction from front to rear, and from the front-edge downwardly, thereby offering to the movement of the airship the least resistance, while the downwardly and rearwardly inclined surfaces 56, of the compartments 53, form a series of inclined planes, and thereby assist in the maintenance of the floating ability of the airship. The sides of the wings B are also serrated as shown at 55, so that, when the wings are closed or folded down and the air-ship is floating and moving forward in water, the inclined surfaces act as inclined planes to effect a partial raising of the air-ship in the water.

In order to carry passengers upon the airship, there is in the main body a longitudinal passage 59, leading from the rear-wall 16 forward to, and terminating behind the first forward set of hemispheres. This passage is hermetically closed on all sides except where it ends at the rear-wall, where there is an ample opening through which entrance to the passages and the engine room, 56$^a$, may be had, and through which an ample air-supply for the passengers and the motor is had. A ladder or steps, 57, lead from this passage into the engine room 56$^a$, and from thence and through a suitable shaft or tube 58, a circular stairs 60 leads to the roof 2 of the main body, thus providing for ventilation as well as furnishing an exit for the passengers when the air-ship is floating upon water and when the lower passage 59 may be partly submerged. This is an essential element in my present construction of air-ships which, it will be readily observed, is capable of floating upon water and is but slightly submerged therein, and, therefore, affords ample protection to the passengers from drowning.

If desired, a trap-door may be located in the floor of the engine room 56$^a$ to prevent passengers from entering the engine room and possible interference with the machinery therein, or the engine-men and employees of the air-ship, which door, in cases of emergency, may be quickly opened to afford an exit for the passengers.

Across the rear-wall of the main body A there is a gallery 61, Figs. 1 and 4, upon which passengers may place themselves. They are thus protected from the rays of the sun, rain, or wind by the overhanging tail D which, as it were, forms a shelter-roof over the gallery, and in order that, when necessary, this tail may fold close to the rear-wall the under side of the tail is concave in form to afford ample space for the gallery 61 and whatever passengers may be thereon.

One of the main objections to air-ships of present construction is their inability to withstand storms, and the recent destruction of Count Zeppelin's air-ship was caused when resting upon the ground where a heavy storm rapidly destroyed the ship. To avoid such destruction, I provide the air-ship with a series of legs 62, which project downwardly from the lower surface of the main body A and will force themselves into the ground and form anchors. As a further means to prevent strong currents of wind lifting the ship from the ground I provide a sufficient number of ropes 63, which are attached with one end to the roof 2, and which have at the other end screw-anchors or other suitable means, 64, which when forced into the ground will effectually hold the air-ship down. And in order that any open spaces below the air-ship may be readily closed, I place upon the upper surface 14, of the wings, grooved bars 65, within which are placed sheet metal plates 66, which, normally lie upon said upper surface and may be locked thereto in any suitable manner. When released and the wings folded in, as they will be when the machine is anchored to the ground, these plates may be released, when they will slide down or may be pushed down upon the ground so as to close the space below the wings and prevent the storm from acting upon the lower surfaces of the airship and its probable lifting up.

I shall now proceed to describe the action of the cyclone producer, assuming that the motor F has been started and all the fans or vanes set into rotation, the innermost fan 32, being that within the cylindrical shell 33, being rotated in the proper direction throws the air entering the shell from above, downwardly as does also the fan 39, the air entering the cylinder passing thereto beneath the inner hemispherical surface where frictional resistance to the moving air upon said surface asserts a lifting influence upon said hemispherical shell. The upper fan 40 which revolves with the cylinder, but acts in contra direction, throws air passing into the hemispherical shell, against this shell upwardly so that its frictional influence is also asserted thereupon and also the air supplied from the inner fan 32. There is, notwithstanding the fact that the air by the outer fan 39 is thrown or forced downwardly, nevertheless, an upward current in the space between the cylinder 33 and the hemispherical shell which asserts its frictional influence upon the outer fans and its lifting influence thereon.

When in a vertical position, the action of all the cyclone-producers will lift the airship vertically until a sufficient elevation is reached for horizontal movement. To accomplish this, all the cyclone-producers are forwardly inclined in the manner already stated so that the action of the cyclone-producers is obliquely to the direction of movement of the ship, part of said action being absorbed in maintaining floating, and the remainder in forward movement of the airship. If it is desired to change the direction of movement either upward or downward, the forward or the rearward series of cyclone-producers alone are changed in position which will cause a change in the vertical direction in a manner readily comprehended. So, in order to steer the ship to describe a circle or other deviation from a straight course, either one or the other of the forward or rearward, or both forward and rearward cyclone-producers are changed in their angular position. For instance, (using nautical terms) if it is desired to turn the bow (in this instance the head C) to port, the starboard forward series of cyclone-producers will be slightly deeper inclined than the port series. The starboard series of cyclone-producers being, therefore, the more powerful, will cause the head to swing to port. This may be assisted by slightly inclining the rearward port-series of cyclone-producers, while a reverse movement of these cyclone-producers will cause the ship to assume a contrary direction.

Should, for any reason, the air-ship land in a body of water, the cyclone-producers when inclined, act as propellers to cause the forward movement of the ship, but as soon as the cyclone-producers are placed into the vertical position, the air-ship will immediately rise out of the water and assume its flight in the air. As an additional aid to steering the air-ship, a rudder 67, Fig. 1, may be placed near the stern of the ship below the floor, in a manner readily comprehended. I have heretofore described how the cyclone-producers, when standing in a vertical position, are capable of lifting the air-ship vertically. It will hence follow, that if these cyclone-producers are operated at a reduced speed, it is possible to maintain the air-ship stationary at any position in the air. If a current of air should have a tendency to move the air-ship horizontally, and it is desired to maintain a fixed position, the ship is headed into the air-current and the cyclone-producers slightly inclined, sufficiently so to overcome the action of the air-current, and the cyclone-producers rotated at a speed to maintain its stationary position.

It will be further observed that in case of a storm, when the air-ship is lowered and anchored to the ground to avoid any damages that might result from the inclemencies of the weather, the passengers within the air-ship are fully protected against any injury or discomfort while thus interrupted in their aerial passage.

It is evident that in order to secure sufficient buoyancy, all the parts of the ship should be made as light as possible, consistent with the required strength, and for this reason aluminum is very extensively employed in this air-ship.

In describing the various details of this air-ship I have shown and explained the preferred forms of construction as far as necessary to specify an operative device. I desire it understood that these details may, however, be varied in many ways without departing from my invention.

I have heretofore, in connection with the cyclone-producers, mentioned the semi-circular bars, as a spider which has the circular or annular bands or rings 37ª and 38 to connect the spider or spokes securely together, and thereby to form, as it were, a cage within which the respective fan-wings are located, so that, in claiming as an element a "cage", it is understood that any suitable bar, or rod-construction, within which the fan-wings are located and to which some of the fan-wings are secured to rotate with the cage is embraced by the term cage.

Having thus fully described my invention and ascertained the most desirable manner in carrying it into effect, I claim as new and desire to secure to me by Letters Patent of the United States—

1. An air-ship embracing the following elements and instrumentalities: a metallic, hollow, hermetically-sealed, body, adapted to be filled with a fluid lighter than air, a motor within said body, a series of cyclone-producers therein and connected with said motor, said cyclone-producers being provided with means for changing their operative position from a vertical to an inclined position whereby the air-ship is enabled to rise vertically and move in a horizontal or any inclined direction and change its course of movement.

2. An air-ship consisting of metallic, hollow, gas-tight bodies adapted to retain a fluid lighter than air, a motor in one of said bodies, a plurality of rotating fans inclosed in shells open at the bottom, said shells forming an integral part of the hermetically-sealed main body; means for causing a vertical movement of said bodies in the air and for propelling said bodies in any other direction, by changing the axis of rotation of the fans within said shells from a vertical to an inclined position, said means being actuated by said motor.

3. An air-ship consisting of a metallic, hollow, gas-tight main body adapted to retain a fluid lighter than air; wings hinged to said main body and consisting of a series of hollow independent containers, a head hinged to said body and adapted to be folded downwardly, a tail hinged to the rear-end of said main body, said tail, wings and head being hollow bodies adapted to retain gas or other fluid lighter than air, propelling mechanism for moving said bodies in any direction, and a motor for actuating said propelling mechanism.

4. In an airship, means for propelling the ship in every direction, said means comprising a series of fan-wheels located within inclosures forming a part of the sealed main body and open at their lower ends, and means for changing the axial line of rotation of said wheels from a vertical to a horizontal position, whereby the ship is enabled to move in every direction, as specified.

5. In an air-ship, a metallic, gas-tight, hollow body; an adjustable head on the forward end of said body, a movable tail hinged to the rear-end of said body, and movable wings on the side of said body, said bodies being capable of retaining a fluid medium lighter than air; a motor in said body; a series of rotating fans in said body and inclosed in a hemispherical shell, said rotating fans being provided with means for changing their position as specified.

6. In an air-ship, a rotating fan system, consisting, essentially, of a hemispherical shell; a cylinder centrally within said hemisphere; spiral vanes within said cylinder and secured thereto; other spiral vanes attached to the outer surface of said cylinder; a cage; a series of spiral vanes attached to said cage, and means for rotating the various vanes as described.

7. In an air-ship a rotating fan system consisting, essentially, of a hemispherical shell; a cylinder centrally located within said shell; spiral vanes within said cylinder and secured thereto, other spiral vanes attached to the outer surface of said cylinder; a cage; a series of spiral vanes attached to said cage; means for rotating the various vanes, and further means for enabling the axis of rotation of all the fans to be changed from a vertical to an inclined position.

8. In an air-ship, the combination with the main body, hermetically sealed and charged with gas lighter than air, of a multiple series of fan motors, said motors being located within inclosures forming a part of the main body and being operated in unison but each of the series of fan-motors being adapted to change their axis of rotation from a vertical to an inclined position whereby the air-ship may be steered by changing the inclination of one or more of the sets of fan-motors, as specified.

9. In an air-ship a pair of wings, each consisting of a series of hollow bodies of triangular cross-section, and united to a common roof, the forward wall of said bodies being rearwardly inclined, whereby a series of inclined planes are produced, said hollow bodies being constructed to retain a medium lighter than air.

10. In an air-ship, a main body, a pair of wings hinged to said main body, and a series of plates upon said wings, said plates being arranged to slide in grooved members secured to the roof of said wings and to be pulled outwardly to form extensions of said wings, as described.

11. In an air ship, means for propelling the ship in every direction, comprising a multiple series of fan-wheels located within inclosures forming a part of the sealed main body and open at their lower ends, means for changing the axial line of rotation of the several series of fan-wheels independently of one another, from a vertical to a horizontal position, whereby the airship is enabled to move in every direction by manipulating the several series of fan-wheels, as specified.

12. Means for inclosing and anchoring an air-ship upon the ground consisting of a main-body; a head adapted to be folded down, a tail adapted to be folded against the rear-end of said main body; wings adapted to be folded against the sides of said body, extensions on said wings adapted to cover the space between the wings and the ground, and anchoring ropes having anchors adapted to be forced into the ground, whereby the entire air-ship is tightly inclosed from all sides and ends, and securely anchored to the ground, as stated.

13. An air-ship embodying the following elements: means for causing the air-ship to rise vertically in the air; means for steering the air-ship and to cause it to assume any direction of movement; means for sustaining the air-ship in a floating and operative condition in water; means for propelling the air-ship while in water; means for causing it to rise vertically out of the water to resume its flight in air; means for securely anchoring the air-ship upon ground, and means for inclosing the air-ship to protect it from the elements, the latter means being all secured to, and forming a part of, the complete air-ship.

In testimony that I claim the foregoing as my invention I have hereunto set my hand in the presence of two subscribing witnesses.

R. SCHMIECHEN.

Attest:
MICHAEL J. STARK,
C. KNUDSEN.